United States Patent [19]

Saft

[11] Patent Number: 4,929,310
[45] Date of Patent: May 29, 1990

[54] APPARATUS FOR DEODORIZING ORGANIC LIQUIDS

[75] Inventor: Helmut Saft, Friedberg, Fed. Rep. of Germany

[73] Assignee: Metallgesellschaft AG, Frankfurt am Main, Fed. Rep. of Germany

[21] Appl. No.: 344,650

[22] Filed: Apr. 27, 1989

[30] Foreign Application Priority Data

Apr. 27, 1988 [DE] Fed. Rep. of Germany ....... 3814254

[51] Int. Cl.⁵ .......................... B01D 3/10; B01D 3/38
[52] U.S. Cl. ........................ 202/158; 55/198; 202/205; 202/234; 261/124; 261/DIG. 76
[58] Field of Search ............... 202/158, 205, 234; 203/92, 96; 261/114.1, 124, DIG. 76; 55/198; 422/231

[56] References Cited

U.S. PATENT DOCUMENTS

| | | | |
|---|---|---|---|
| 2,184,579 | 12/1939 | Brucke | 202/234 |
| 3,693,322 | 9/1972 | Lineberry | 202/234 |
| 4,036,865 | 7/1977 | Hartmann et al. | 203/92 |
| 4,483,747 | 11/1984 | Aruga et al. | 203/92 |

*Primary Examiner*—Joye L. Woodard
*Attorney, Agent, or Firm*—Herbert Dubno

[57] ABSTRACT

The deodorizing apparatus is used to treat organic liquids, such as edible oils or edible fats, in that they are stripped with water vapor under subatmospheric pressure and at temperature from about 130° to 260° C. The liquid to be treated is passed through one or more treating levels and is agitated therein by rising water vapor. At least one of the treating levels contains numerous conical circulating ducts, which can be flown through in an upward direction and are provided with a water vapor inlet in their lower portion, which is narrower in cross-section. The cone angle of the circulating duct measured against the vertical may vary from 5° to 20° C.

4 Claims, 1 Drawing Sheet

APPARATUS FOR DEODORIZING ORGANIC LIQUIDS

CROSS REFERENCE TO RELATED APPLICATION

This application is related to the commonly owned copending application filed concurrently herewith (Ser. No. 07/344,659).

FIELD OF THE INVENTION

My present invention relates to an apparatus for deodorizing organic liquids by stripping with water vapor under subatmospheric pressure and at temperatures of about 130° to 260° C., wherein the liquid to be treated is passed through one or more treating stories or levels and is agitated therein by rising water vapor.

BACKGROUND OF THE INVENTION

A deodorizing apparatus of this type is known and usually serves to remove mainly free fatty acids and disturbing taste-imparting and odor-imparting substances from, for example, edible oils or edible fats.

This is usually effected under a pressure in the range from about 2 to 8 millibars. The treatment is carried out at temperatures below the boiling temperature of the liquid. Excessively high temperatures would adversely affect the taste and appearance of the treated product.

OBJECTS OF THE INVENTION

It is an object of the invention to provide a deodorizing apparatus which is as effective as possible and to reduce the demand for stripping vapor, the treating temperature and the treating time.

Another object of my invention is to provide an improved apparatus for deodorizing organic liquids in which the agitation or circulation of the organic liquid by the steam is rendered more effective.

Another object of the invention is to provide an improved apparatus for the steam stripping of organic liquids, Particularly oils and fatty acids which overcomes drawbacks of earlier apparatuses.

SUMMARY OF THE INVENTION

This is accomplished in accordance with the invention in that at least one of the treating levels comprises numerous frustoconical circulating ducts, which are adapted to be traversed by the liquid in the upward direction and are provided with a water vapor inlet in their lower portion which is narrower in cross-section, and the cone angle (A) of the circulating duct measured against the vertical is 5° to 20°.

The stripping vapor rises in the circulating duct and the upwardly flaring conical shape of the duct causes the bubbles of water vapor to rise at a reduced velocity. The longer residence time of the water vapor adjacent to the circulating duct, which contains also the liquid to be treated, has the effect that the contact between the vapor and the liquid is intensified and the entraining of the undesired substances by the water vapor is improved.

More specifically, the apparatus for steam stripping organic liquid at a temperature of 130° to 260° C. and preferably 180° to 260° C. and a subatmospheric pressure of, say, 2 to 8 mb, can comprise:

a treatment vessel;

means connected with the treatment vessel for applying a subatmospheric pressure thereto;

means in the treatment vessel defining at least one treatment level upon which a body of predetermined height of an organic liquid to be deodorized is maintained, the organic liquid being at a temperature of substantially 130° to 260° C.;

a plurality of upwardly open frustoconical circulating ducts spaced apart at the level and diverging upwardly with a conical half-angle A of substantially 5° to 20° to the vertical from a lower portion having a small cross section and receiving the liquid from below; and means for introducing water vapor into the ducts at a lower portions thereof for stripping the liquid with the water vapor and for inducing upward flow of the liquid in the duct.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
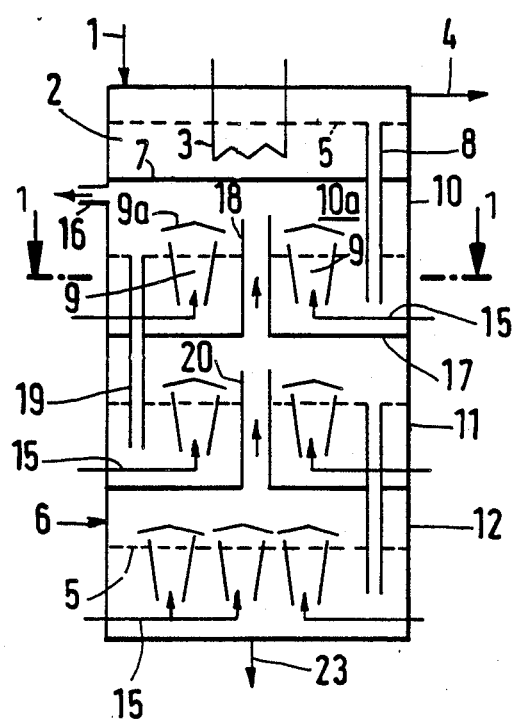
FIG. 1 is a highly diagrammatic longitudinal sectional view showing a deodorizing apparatus.

The liquid to be treated, such as edible oil or edible fat, is fed in a liquid state through line 1 to the deodorizing apparatus, which is diagrammatically shown in FIG. 1.

Figure 4:
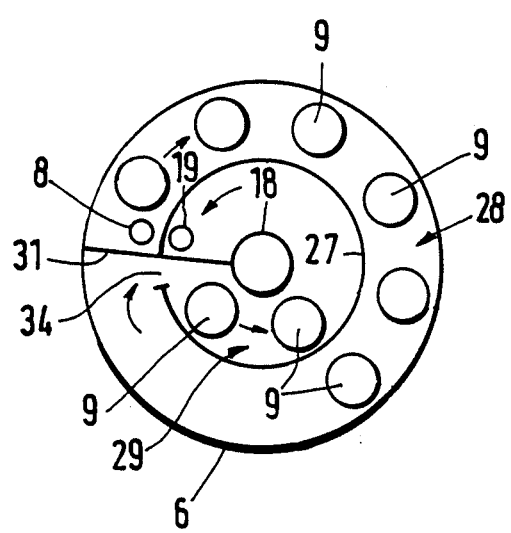
FIG. 4 is a somewhat enlarged transverse sectional view taken on line IV—IV of FIG. 1 and showing a treating level of FIG. 1.

The apparatus consists of a column having a cylindrical housing wall 6, see also FIG. 4. The liquid first enters a heating chamber 2, which contains a heater 3, and is heated there to temperatures of 180° to 260° C. Gases and vapors evolved thereby may be removed through line 4. A broken horizontal line 5 indicates the liquid level in the chamber 2 and in the subsequently described treating levels of the deodorizing apparatus.

The chamber 2 has a liquid-tight bottom 7 and a drain pipe 8, through which the liquid is supplied to the uppermost treating level 10. That level contains numerous circulating ducts 9, only two of which are showing in FIG. 1 for the sake of clearness.

Each circulating duct is supplied from the outside through a line 15 with water vapor, which rises in the duct 9 in the form of fine bubbles and by an airlift action agitates liquid and entrains undesired substances initially into the gas space 10a of the treating level. Gases and vapors are sucked from there through the outlet 16. Each circulating duct 9 has associated with it a baffle 9a, which is disposed in the gas space and particularly ensures that liquid droplet will be caught and conducted back into the liquid.

The bottom 17 of the treating level 10 is provided with a central uptake 18, through which gases and vapors from the underlying treating level 11 are conducted upwardly to the gas space 10a and then to the outlet 16.

The treating level 11 has the same basic design as the level 10. It is supplied with liquid from the next upper level 10 through the drain pipe 19. From the level 11 the liquid then enters the lowermost treating level 12, which differs from the overlying levels 10 and 11 in that it has no central duct. Gases and vapors flow from the lowermost level 12 first through the uptake 20 and then through the uptake 18 to the outlet 16. Treated liquid is withdrawn in line 23 and is first conducted through a cooler, which may alternatively be integrated in the deodorizer but has been omitted in the drawing.

Figure 2:
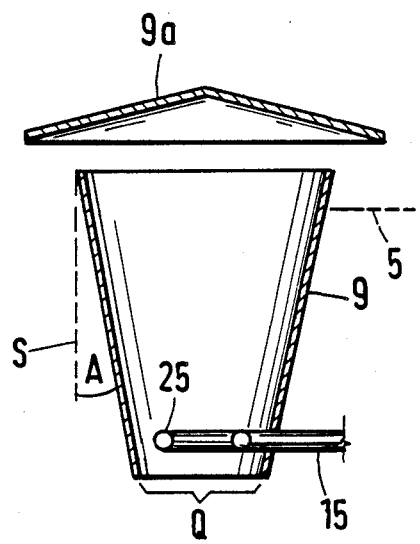
FIG. 2 is a longitudinal sectional view showing a conical circulating duct.

The circulating duct 9 which is shown on a larger scale in FIG. 2 consists of an upwardly flaring conical tube. The cone angle (A) measured against the vertical (S) amounts to 5° to 20°. A baffle 9a is spaced over the duct 9 and ensures that liquid droplets entrained by the rising water vapor will be caught and conducted back into the liquid. During operation, the duct 9 protrudes somewhat over the liquid level, as is indicated by the broken line 5 which indicates the liquid level.

Figure 3:
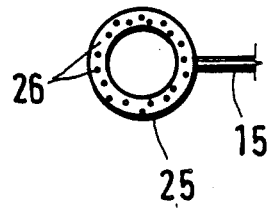
FIG. 3 is a top plan view showing an annular conduit for feeding water vapor.

The water vapor which effects the treatment is supplied in line 15 to each circulating duct 9, see FIGS. 1 to 3, and through an annular conduit 25, which is seen in a top plan view in FIG. 3, exits into the interior of the duct 9. The annular conduit 25 is provided with numerous bores 26, see FIG. 3, through which the water vapor escapes. This results in the desired finely dispersed distribution of the water vapor and the annular conduit also ensures that the water vapor will flow in the circulating duct 9 through all regions in the interior of the duct and centrally rising large bubbles will not form.

The circulating duct 9 (see particularly FIG. 2), usually has a height of 0.3 to 1.5 meters without the baffle 9a. The ratio of the smallest cross-section (Q) to the height of the duct is in the range from 1:3 to 1:15.

FIG. 4 is a diagrammatic horizontal sectional view showing how a treating level may be designed. A vertical cylindrical wall 27 is provided, which is concentric to the central uptake 18 and is liquid tightly connected to the bottom of the level and defines an outer annular passage 28 with the housing wall 6 and an inner annular passage 29 with the uptake 18. Regularly spaced apart circulating ducts 9 are installed in the two annular passage 28 and 29. Only a few of these ducts are indicated in FIG. 4 for the sake of clearness.

A vertical partition 31 extends between the housing wall 6 and the central uptake 18. The walls 27 and 31 have about the same height as the chimney 18 so that the gases and vapors can flow freely through the gas space 10a (see FIG. 1) in each treating level. The walls 27 and 31 are not shown in FIG. 1.

The liquid to be treated initially flows through the supply line 8 into the outer annular passage 28 and flows therein a clockwise sense from one circulating duct 9 to the other and is treated with water vapor in each of said ducts for a certain residence time. The supply lines for water vapor have not been shown in FIG. 4. The liquid finally flows through the aperture 34 in the cylindrical wall 27 into the inner annular passage 29 and flows in the latter in a counterclockwise sense. In the passage 29, the liquid is successively treated in the ducts 9 which are closely spaced apart. The liquid finally enters the drain pipe 19 and flows into the next lower treating level.

Each treating level may be provided with a plurality of annular passages, which are consecutively flown through, or with only a single annular passage. The circulating ducts 9 in each annular passage constitute a circular array. The lowermost treating level 12 may also comprise one or more of such annular passages. The number of treating levels may vary and is usually between one and five.

I claim:

1. An apparatus for deodorizing an organic liquid, comprising:
   a treatment vessel;
   means connected with said treatment vessel for applying a subatmospheric pressure thereto;
   means in said treatment vessel defining at least one treatment level upon which a body of predetermined height of an organic liquid to be deodorized is maintained, said organic liquid being at a temperature of substantially 130° to 260° C.;
   a plurality of upwardly upon frustoconical circulating ducts spaced apart at said level and diverging upwardly with a cone angle A, measured against the vertical, of substantially 5° to 20° from an open lower portion having a small cross section and receiving said liquid from below;
   each of said ducts having a height of 0.3 to 1.5 m and a ratio of a smallest diameter to said height of said duct of substantially 1:3 to 1:15;
   each of said ducts at said lower portion being provided with an annular conduit coaxial with said duct and having a multiplicity of bores for discharging water vapor into said liquid within said duct for inducing upward flow of said liquid in said duct; and
   means for introducing water vapor into said annular conduit of each duct.

2. The apparatus defined in claim 1 wherein said vessel is provided with a succession of said treatment levels in vertically spaced relationship, and further comprising means for conducting said liquid from a higher first of said levels downwardly to a lower second of said levels, each of said first and second levels being provided with a plurality of said frustoconical circulating ducts and respective means for introducing said water vapor into said annular conduit of each duct.

3. The apparatus defined in claim 2, further comprising means for delivering said liquid to be deodorized to an uppermost one of said levels.

4. The apparatus defined in claim 2 further comprising an annular channel within said vessel, said channel forming a path for said liquid from one end to an opposite end thereof, said circulating ducts of each of said treatment levels being arranged in at least one circular array along said annular channel.

* * * * *